(12) United States Patent
Nord

(10) Patent No.: US 7,528,692 B2
(45) Date of Patent: May 5, 2009

(54) VOLTAGE STRESS REDUCTION IN MAGNETICS USING HIGH RESISTIVITY MATERIALS

(76) Inventor: Jonathan Paul Nord, 2306 Quiet Bay St., Pearland, TX (US) 77584-8254

( * ) Notice: Subject to any disclaimer, the term of this patent is extended or adjusted under 35 U.S.C. 154(b) by 0 days.

(21) Appl. No.: 11/735,648

(22) Filed: Apr. 16, 2007

(65) Prior Publication Data

US 2007/0241854 A1 Oct. 18, 2007

Related U.S. Application Data

(60) Provisional application No. 60/792,105, filed on Apr. 14, 2006.

(51) Int. Cl.
*H01F 21/02* (2006.01)
*H01F 27/28* (2006.01)

(52) U.S. Cl. .................. 336/145; 336/182; 336/184
(58) Field of Classification Search .......... 336/145–146, 336/182–184, 5, 12, 15
See application file for complete search history.

(56) References Cited

U.S. PATENT DOCUMENTS

| 4,910,482 A | * | 3/1990 | Takagai et al. ............... 333/181 |
| 5,847,518 A | * | 12/1998 | Ishiwaki ..................... 315/276 |
| 6,049,266 A | * | 4/2000 | Hoshino et al. ............. 336/180 |

* cited by examiner

*Primary Examiner*—Anh T Mai
(74) *Attorney, Agent, or Firm*—Lafkas Patent LLC; David M. Lafkas

(57) ABSTRACT

The present invention includes a high voltage transformer and high voltage inductor having a high resistivity magnetic core and multiple secondary windings without needing insulation between the high resistivity core and multiple secondary windings.

12 Claims, 3 Drawing Sheets

VOLTAGE STRESS REDUCTION IN MAGNETICS USING HIGH RESISTIVITY MATERIALS

CROSS-REFERENCE TO RELATED APPLICATION(S)

The present invention claims priority to U.S. Provisional Patent Application No. 60/792,105 filed Apr. 14, 2006.

STATEMENT REGARDING FEDERALLY SPONSORED RESEARCH

Not applicable.

NAMES OF THE PARTIES TO A JOINT RESEARCH AGREEMENT

Not applicable.

INCORPORATION-BY-REFERENCE OF MATERIAL SUBMITTED ON A COMPACT DISC

Not applicable.

BACKGROUND ON THE INVENTION

1. Field of the Invention

The present invention relates generally to electrical transformers, and more particularly relates to high voltage transformers having a substantially high resistivity magnetic core material.

2. Description of the Related Art

Traditionally, in order to derive a high voltage DC output from a relatively lower voltage, one would utilize a transformer having a high secondary to primary turns ratio. Typically, for a fixed wind layer patterning and overall geometry, a second parasitic capacitive impedance reflected to the primary decreases linearly with frequency as well as the square of the turns ratio. Therefore, as the turns ratio, i.e., required output voltage, increases for a fixed output power level and optimum operating frequency, the reactive current that is required to drive the secondary parasitic capacitance becomes greater and may surpass the non-reactive current responsible for power flow to an output rectifier. In order to compensate and limit converter and transformer copper losses, increasing turn ratios is typically not used as a means to achieve high voltage DC output.

In the 1930s Cockcroft and Walton first demonstrated a now-common method of achieving high voltage DC output. Such method is still widely used in industry at power levels mostly below about 50 kW.

Cockcroft and Walton developed a voltage multiplier that provides capacitive current transfer to rectifier stages which operate at potentials defined by the outputs of lower capacitively coupled rectifier stages. Operation of such voltage multiplier is sustained by virtue of the coupling capacitors receiving a charging current while acting as a return path during the charging of its coupled stage.

There have been significant improvements to rectifier and capacitor technology, the above voltage multiplier suffers from a variety of issues including, for example, low reliability, high cost, and large size.

With regard to reliability, the above voltage multiplier typically has a poor thermal path for dissipation emanating from the diode in the center of series packaged HV diode assemblies. Further, initial voltage gradients are often sufficient enough to result in electron impact ionization and avalanche current.

Regarding the size issues, such voltage multiplier typically have coupling capacitors which must handle bidirectional currents sufficient to handle all stages above. Furthermore, bulky insulation is typically required in order to allow for an adequate lifetime under severe voltage stresses.

Such voltage multipliers are relatively expensive due to the special high voltage capacitors and diodes used.

Another approach to producing a high voltage output is by using multiple secondaries. Each of the secondaries produces rectified DC outputs, and each of the secondaries are series connected to provide a very high voltage. The secondaries may be arranged such that the AC fields between nearby secondaries are minimized, i.e., make the stresses DC, a much lower reflected capacitance is achieved than using a single secondary. This approach typically uses more relatively common available components and has a relatively improved diode thermal issue than compared to the above voltage multiplier. However, this approach has a ground referenced magnetic core which couples magnetic energy to the secondaries. This requires a significant amount of insulation because of capacitive coupling as compared to the above voltage multiplier.

SUMMARY

The various exemplary embodiments of the present invention include a high voltage transformer comprised of a high resistivity magnetic core, a primary winding configured to enclose magnetic flux induced in at least some portion of the high resistivity magnetic core, and secondary windings configured to enclose magnetic flux induced in another portion of the high resistivity magnetic core. A portion of the secondary windings operate at a voltage substantially similar to that of at least some portion of adjacent high resistivity magnetic core arising from connections of the high resistivity magnetic core to voltages substantially similar to those of adjacent secondary windings. The connections are made in at least two locations of substantially different voltages, and the connections result in current flow in the high resistivity magnetic core.

The various exemplary embodiments of the present invention further include an inductor comprised of a high resistivity magnetic core and inductor windings configured to enclose magnetic flux induced in at least some portion of the high resistivity magnetic core. A portion of the inductor windings operate at a voltage substantially similar to that of at least some portion of adjacent high resistivity magnetic core arising from connections of the high resistivity magnetic core to voltages substantially similar to those of the adjacent inductor windings. The connections are made in at least two locations of substantially different voltages, and the connections result in current flow in the high resistivity magnetic core.

BRIEF DESCRIPTION OF THE DRAWINGS

The various exemplary embodiments of the present invention, which will become more apparent as the description proceeds, are described in the following detailed description in conjunction with the accompanying drawings, in which.

DETAILED DESCRIPTION

The various exemplary embodiments of the present invention utilize a magnetic core material having a very high resistivity. Such magnetic core material allows for a high voltage transformer having the benefits of using multiple secondaries connected in series but without the requires insulation between a core and the secondary windings. It is preferred that a portion of the core near a primary is made to operate at a voltage substantially similar to that of the primary windings due to connection to a circuit node of similar voltage relative to the primary.

In a similar fashion, in exemplary embodiments of the present invention it is preferred that the portion of the core near at least one secondary is made to operate at a voltage substantially similar to that of the secondary windings due to connect to a circuit node of similar voltage relative to the secondary.

Figure 1:
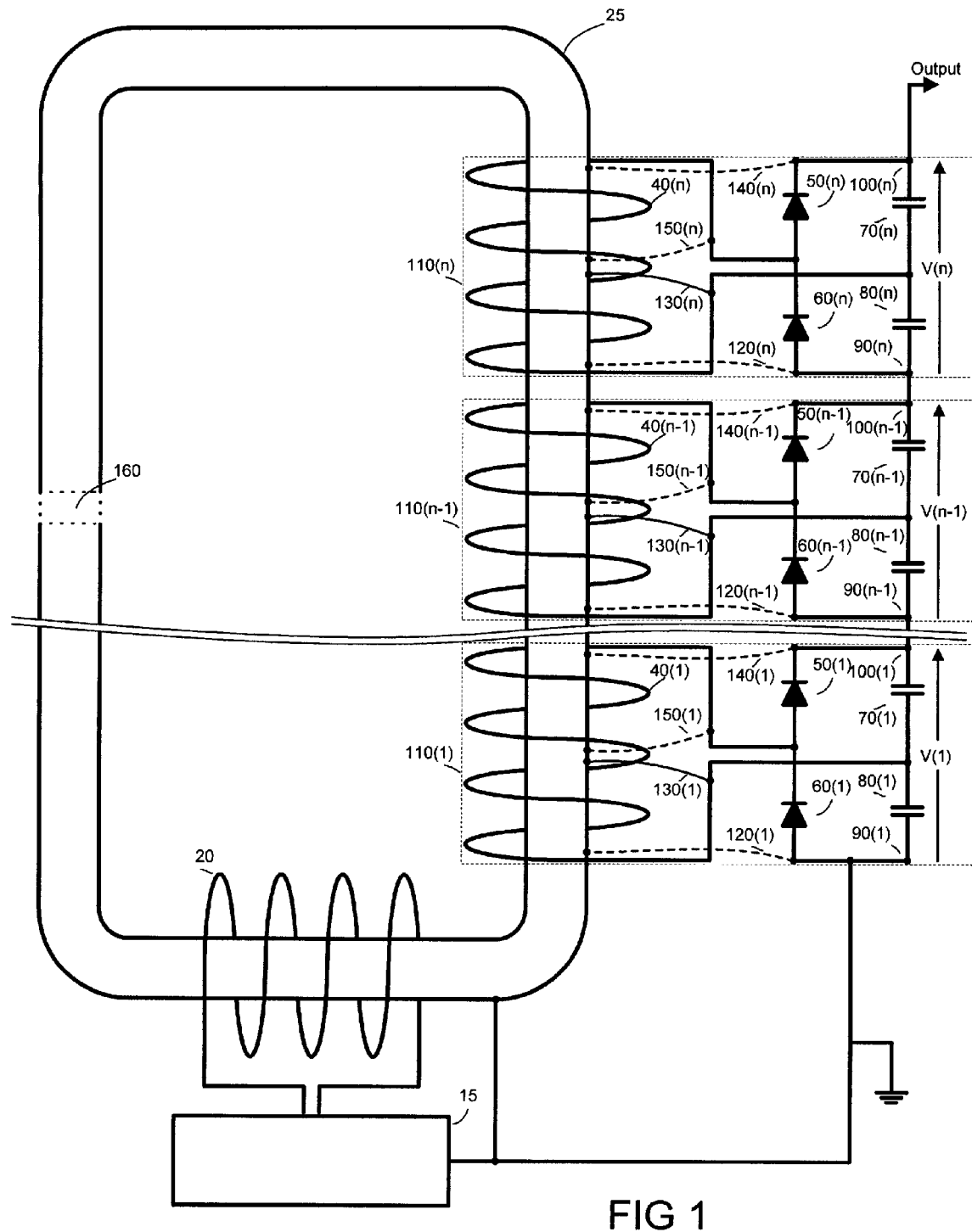
FIG. 1 is a schematic diagram of a transformer according to exemplary embodiments of the present invention.

FIG. 1 illustrates an exemplary embodiment of a transformer 10 according the present invention. A converter 15 drives an AC voltage into a primary winding 20 to induce a time-varying magnetic flux in a high resistivity magnetic core 25. In a preferred embodiment, the high resistivity magnetic core is comprised of a nickel-zinc (NiZn) ferrite composition. The time-varying magnetic flux causes voltage to be induced in a first secondary winding 40(1) in which positive and negative currents are rectified by diodes 50(1) and 60(1) thereby charging filter capacitors 70(1) and 80(1), respectively. The charging of the filter capacitors provides an output voltage V(1) between negative node 90(1) and positive node 100(1) of an output stage 110(1).

Preferably, each output stage 110(1), 110(n−1), and 110(n) operate in a substantially identical fashion wherein the time-varying magnetic flux causes voltage to be induced in each secondary winding 40(1), 40(n−1), and 40(n) whose positive and negative currents are rectified by each diode 50(1), 50(n−1), 50(n), 60(1), 60(n−1), and 60(n) to charge each filter capacitor 70(1), 70(n−1), 70(n), 80(1), 80(n−1), and 80(n) respectively, which provides an output voltage V(1), V(n−1), and V(n) between each negative node 90(1), 90(n−1), and 90(n) and positive node 100(1), 100(n−1), and 100(n) of each output stage 110(1), 110(n−1), and 110(n), respectively.

A portion of the high resistivity magnetic core 25 near the primary winding 20 is electrically connected to a node at a substantially similar voltage to the operating voltages within the primary winding.

Furthermore, at least one node within at least one output stage is also connected to the high resistivity magnetic core 25. At least one of a first connection 120(1), second connection 130(1), third connection 140(1), and fourth connection 150(1) between at least one node to the high resistivity magnetic core 25 operates at a substantially unequal voltage to the node connected near the primary winding. A minimum preferred connection for optimizing packaging of a high resistivity voltage transformer is the second connection 130(1).

In the circumstances under which there is a substantially uniform volume resistivity in the high resistivity magnetic core 25 below the second connection 130(n), the second connection 130(n) will produce a minimum voltage gradient between the components of equidistantly spaced output stages 110(n−1), 110(n), and 110(1) and the adjacent high resistivity magnetic core 25.

Connecting a greater number of equidistantly spaced instances of the second connection results in more favorable results.

Due to arranging the electrical connections to the high resistivity magnetic core as set forth above and in FIG. 1, a finite resistivity of the high resistivity core materials results in resistive losses due to conduction in the magnetic path. Therefore, it is preferred that a balance between magnetic losses resulting from core volume, peak flux density, and frequency with resistivity losses resulting from each conductive length under applied voltage, core cross section, and resistivity. Having the high resistivity magnetic core material comprised of a NiZn ferrite composition having resistivities greater than $10^7$ Ωm presents a proper balance.

In exemplary embodiments, a core air gap 160 may be present to substantially prevent saturation or reduce core conduction.

Figure 2:
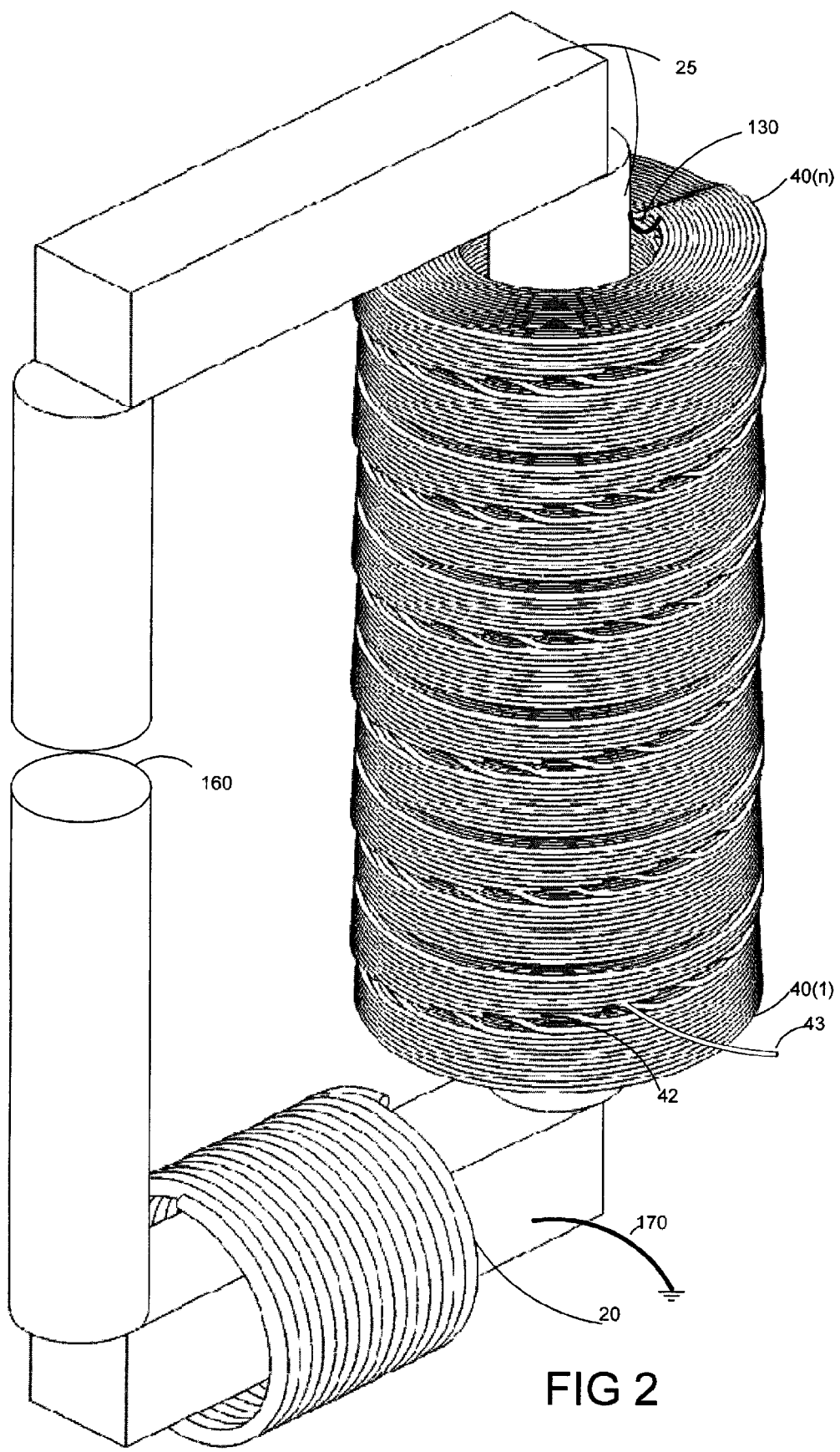
FIG. 2 is a schematic diagram of a transformer according to another exemplary embodiment of the present invention.

FIG. 2 illustrates another exemplary embodiment of the present invention. In this exemplary embodiment, secondary windings 40(1) and 40(n) associated with each stage are helically formed for the majority of their respective circumference; a remainder of each winding provides a transition 42 back to a bottom of the helical form.

The secondary windings in the exemplary embodiment are stacked using a circumferential index, thereby allowing for an exit location for a wire from the inner turn to each rectifier circuitry just beyond an outer diameter, i.e., an inner turn exit lead 43. These secondary windings are connected to series-connected rectifier stages as exemplified in FIG. 1. Such connection results in a rectifier assembly spiraling along-side the exit locations provided by the helical coil form. A first circuit node connection 170 is made to the high resistivity magnetic core 25. A conductor may be connected from one end of a winding layer to an adjacent winding layer.

In a preferred embodiment, the first circuit node connection is common with earth ground due to the preferential operation of the primary winding 20 similar in voltage to earth ground. However, it may be connected to any node at any arbitrary voltage.

In the various exemplary embodiments, at least one other connection 130 which operates at a voltage substantially unequal to the voltage of the first node is also connected to the core. If such a connection is made, the preferential location is a node within a last stage in the series connection.

In the circumstances under which there is a substantially uniform volume resistivity in the high resistivity magnetic core 25 below the connection 130, the connection 130 will produce a minimum voltage gradient between the components of equidistantly spaced output stages and the adjacent high resistivity magnetic core 25.

In exemplary embodiments, a core air gap 160 may be present to substantially prevent saturation or reduce core conduction.

Figure 3:
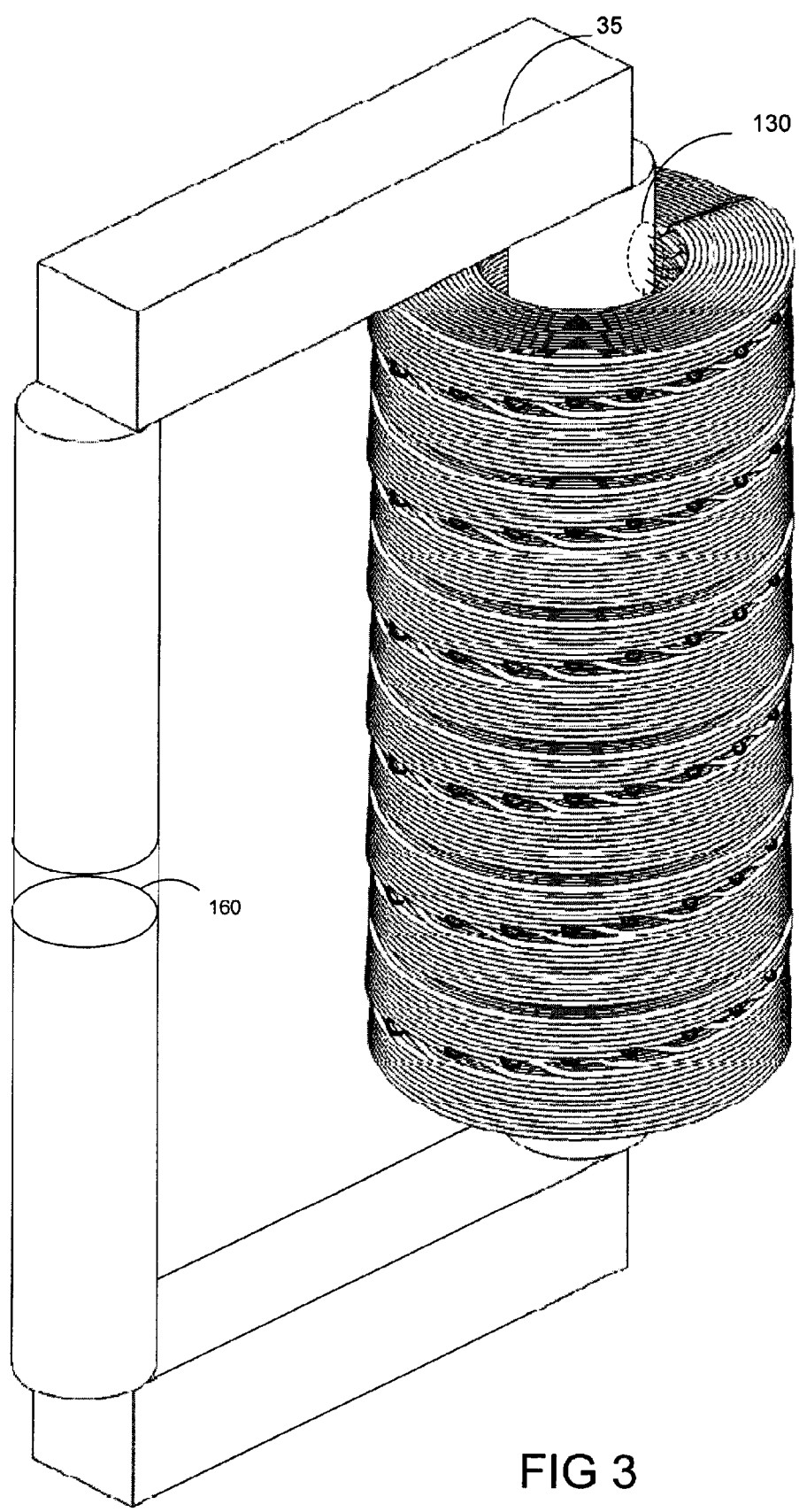
FIG. 3 is a schematic diagram of a transformer according to yet another exemplary embodiment of the present invention.

FIG. 3 illustrates yet another exemplary embodiment of the present invention. In FIG. 3, an inductor having two or more turns inductor windings uses electrical connection 130 to the high resistivity magnetic core 25 to substantially eliminate the voltage gradient present between the inductor windings and the high resistivity magnetic core. There can be multiple connections similar to the electrical connection 130 distributed through a length of the high resistivity magnetic core 25. Multiple such connections minimizes voltage stresses between the inductor windings and the high resistivity magnetic core under both AC and DC voltage conditions.

In the exemplary embodiment illustrated in FIG. 3, the inductor windings are constructed in helical spirals using a transitioning connection from an inner diameter to outer diameter of a inductor winding in order to meet the beginning of the next adjacent helical spiral winding which is located longitudinally above. Resistive losses in the high resistivity magnetic core should be manageable for large resistivities achievable using NiZn ferrites.

In exemplary embodiments in which the inductor is used for damping, the finite resistivity may be favorable to increase the damping factor.

Once more, a core air gap 160 may be present to substantially prevent saturation of reduction of core conduction.

While this invention has been described in conjunction with the specific embodiments outlined above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention.

What is claimed is:

1. A high voltage transformer comprised of:
   a high resistivity magnetic core;
   a primary winding configured to enclose magnetic flux induced in at least some portion of the high resistivity magnetic core; and
   secondary windings configured to enclose magnetic flux induced in another portion of the high resistivity magnetic core;
   wherein a portion of the secondary windings operates at a voltage substantially similar to that of at least some portion of adjacent high resistivity magnetic core arising from connections of the high resistivity magnetic core to voltages substantially similar to those of adjacent secondary windings, the connections being made in at least two locations of substantially different voltages, and the connections resulting in current flow in the high resistivity magnetic core.

2. The high voltage transformer according to claim 1, wherein the secondary windings in close proximity to the high resistivity magnetic core are made to operate at substantially similar voltage as the adjacent high resistivity magnetic core.

3. The high voltage transformer according to claim 2, wherein the secondary windings have a winding geometry having a space between adjacent winding layers where a conductor from one end coil may cross the adjacent winding and meet the conductor existing at the end of the turn at the opposite end of the winding layer, the location of the space being indexed along the winding circumference such that the dimensional stack-up of adjacent layers is much less space.

4. The high voltage transformer according to claim 1, wherein the secondary windings have a winding geometry having a space between adjacent winding layers where a conductor from one end coil may cross the adjacent winding and meet the conductor existing at the end of the turn at the opposite end of the winding layer, the location of the space being indexed along the winding circumference such that the dimensional stack-up of adjacent layers is much less space.

5. The high voltage transformer according to claim 1, wherein an air gap is present in the high resistivity magnetic core.

6. The high voltage transformer according to claim 1, wherein no insulation is present between the high resistivity magnetic core and the secondary windings.

7. An inductor comprised of:
   a high resistivity magnetic core; and
   inductor windings configured to enclose magnetic flux induced in at least some portion of the high resistivity magnetic core;
   wherein a portion of the inductor windings operates at a voltage substantially similar to that of at least some portion of adjacent high resistivity magnetic core arising from connections of the high resistivity magnetic core to voltages substantially similar to those of the adjacent inductor windings, the connections being made in at least two locations of substantially different voltages, and the connections resulting in current flow in the high resistivity magnetic core.

8. The inductor according to claim 7, wherein the inductor windings in close proximity to the high resistivity magnetic core are made to operate at substantially similar voltage as the adjacent high resistivity magnetic core.

9. The inductor according to claim 8, wherein the inductor windings have a winding geometry having a space between adjacent winding layers where a conductor from one end coil may cross the adjacent winding and meet the conductor existing at the end of the turn at the opposite end of the winding layer, the location of the space being indexed along the winding circumference such that the dimensional stack-up of adjacent layers is much less space.

10. The inductor according to claim 7, wherein the inductor windings have a winding geometry having a space between adjacent winding layers where a conductor from one end coil may cross the adjacent winding and meet the conductor existing at the end of the turn at the opposite end of the winding layer, the location of the space being indexed along the winding circumference such that the dimensional stack-up of adjacent layers is much less space.

11. The inductor according to claim 7, wherein an air gap is present in the high resistivity magnetic core.

12. The inductor according to claim 7, wherein no insulation is present between the high resistivity magnetic core and the secondary windings.

* * * * *